Feb. 10, 1942.  E. W. AUSTIN  2,272,540
EXCAVATOR
Filed Aug. 30, 1940   5 Sheets-Sheet 1
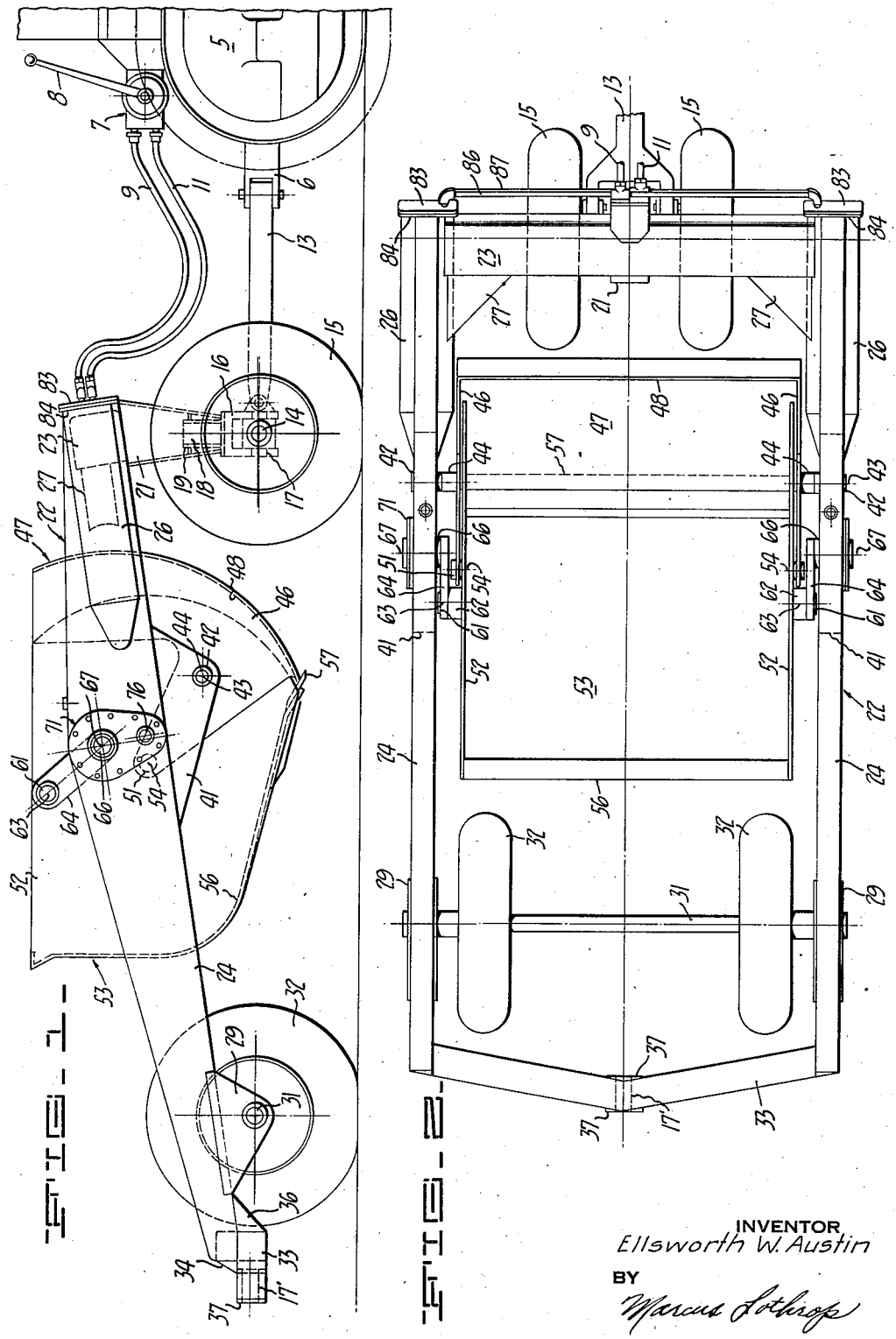
INVENTOR
Ellsworth W. Austin
BY
Marcus Lothrop Feb. 10, 1942.  E. W. AUSTIN  2,272,540
EXCAVATOR
Filed Aug. 30, 1940   5 Sheets-Sheet 2
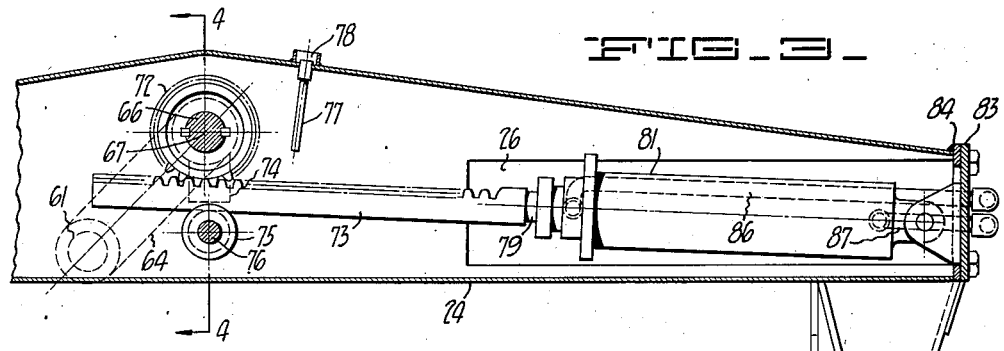
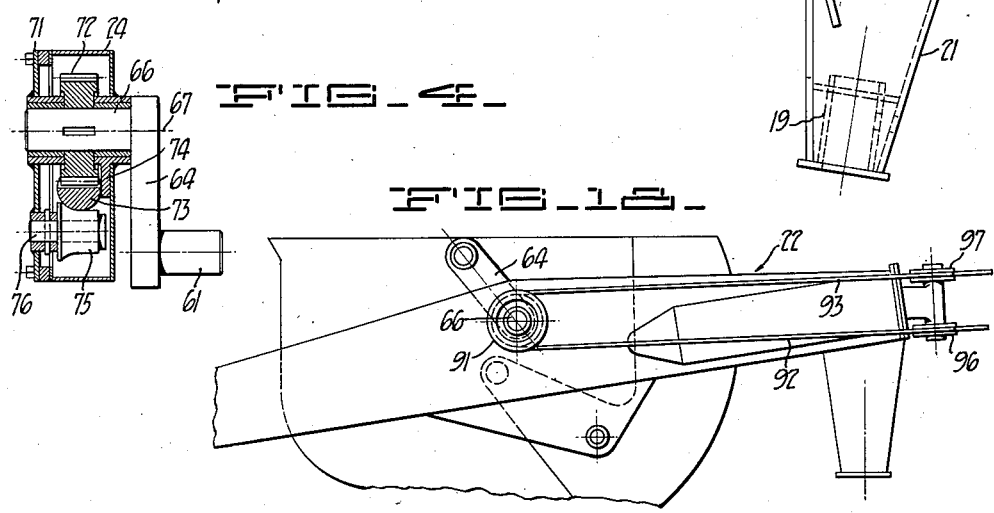
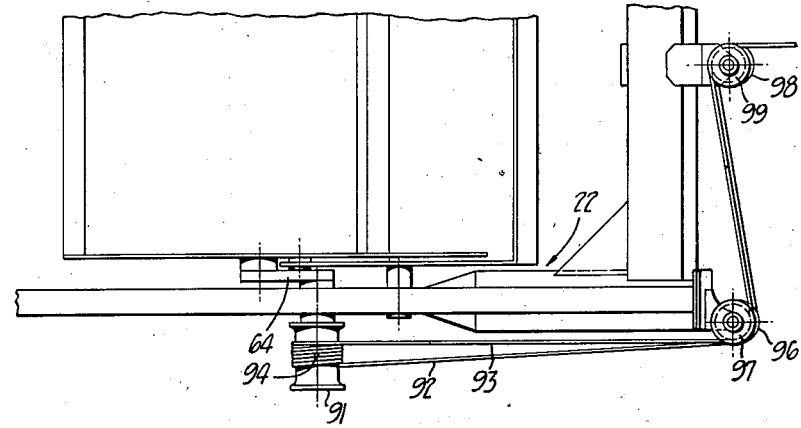
INVENTOR
Ellsworth W. Austin
BY
Marcus Lothrop Feb. 10, 1942.  E. W. AUSTIN  2,272,540
EXCAVATOR
Filed Aug. 30, 1940   5 Sheets-Sheet 3
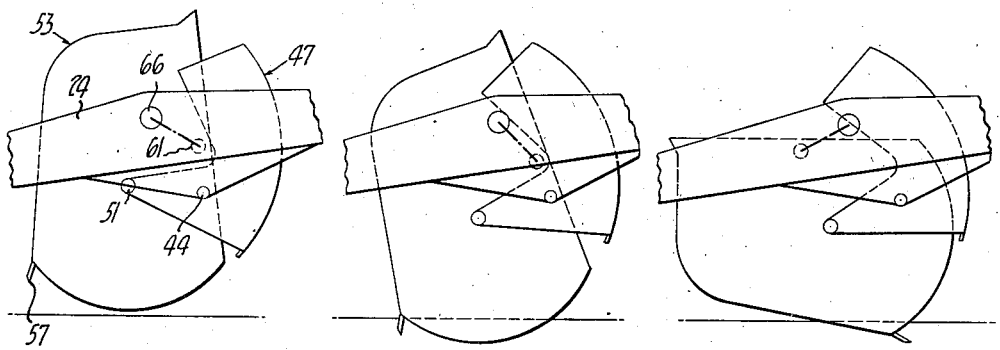
FIG_15.  FIG_16.  FIG_17.
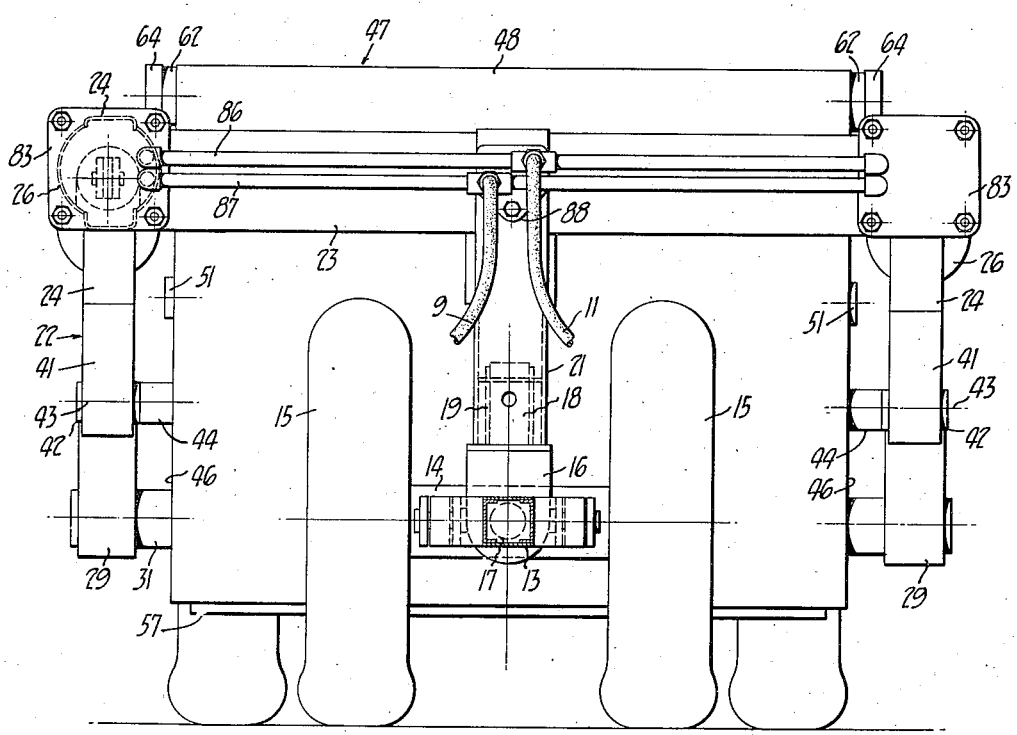
FIG_5.
INVENTOR
Ellsworth W. Austin
BY
Marcus Lothrop Feb. 10, 1942.  E. W. AUSTIN  2,272,540
EXCAVATOR
Filed Aug. 30, 1940  5 Sheets-Sheet 4
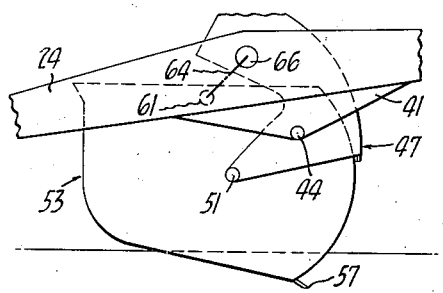
FIG_6_
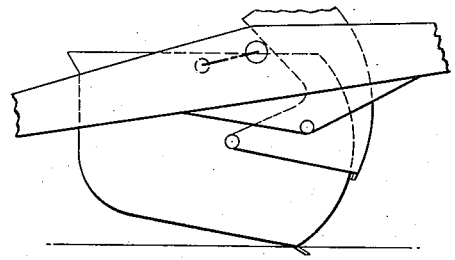
FIG_7_
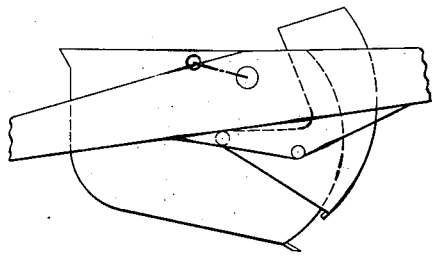
FIG_8_
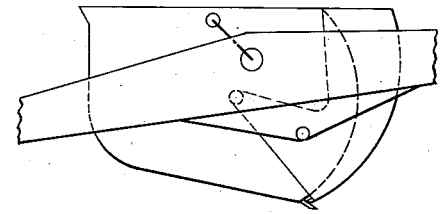
FIG_9_
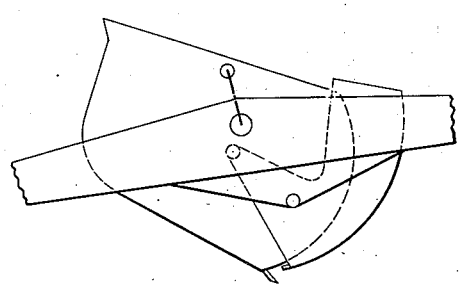
FIG_10_
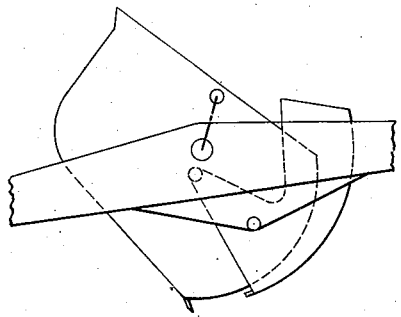
FIG_11_
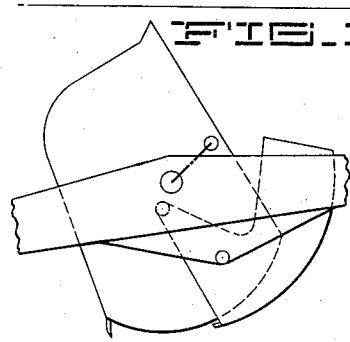
FIG_12_  FIG_13_  FIG_14_
INVENTOR
Ellsworth W. Austin
BY
Marcus Lothrop Feb. 10, 1942.   E. W. AUSTIN   2,272,540
EXCAVATOR
Filed Aug. 30, 1940   5 Sheets-Sheet 5
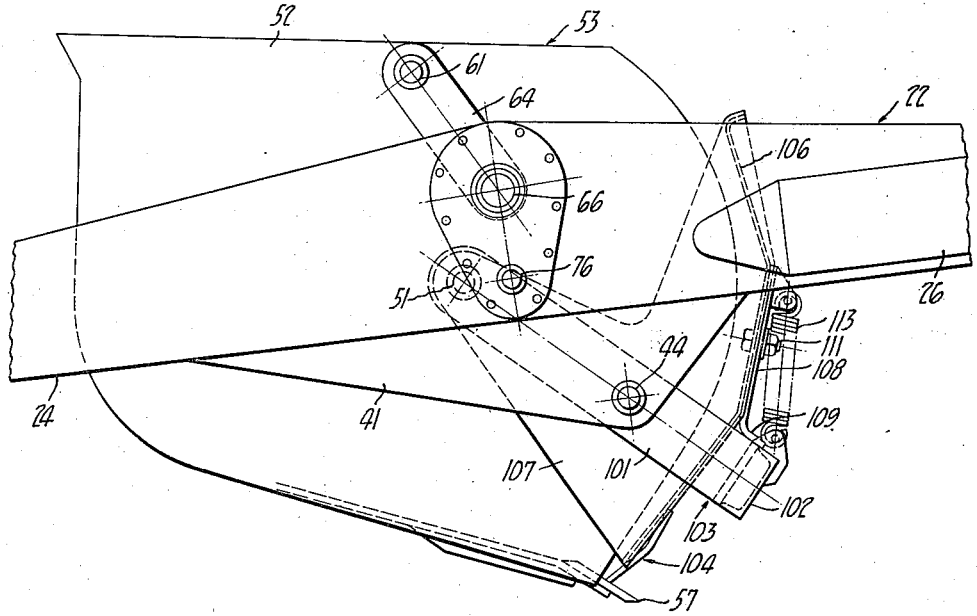
FIG_20_
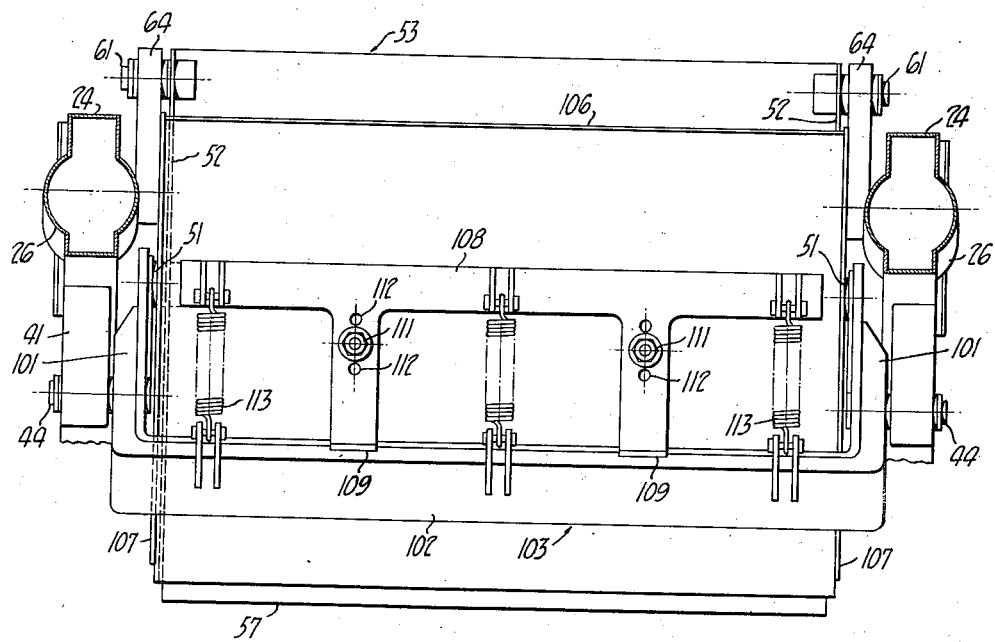
FIG_21_
INVENTOR
Ellsworth W. Austin
BY
Marcus Lothrop Patented Feb. 10, 1942

2,272,540

UNITED STATES PATENT OFFICE 2,272,540

EXCAVATOR

Ellsworth W. Austin, Cedar Rapids, Iowa, assignor to La Plant-Choate Manufacturing Company, Incorporated, Cedar Rapids, Iowa, a corporation of Delaware Application August 30, 1940, Serial No. 354,794

29 Claims. (Cl. 37—126)

My invention relates to means for use in excavating, transporting, discharging and spreading earth-like materials, and is particularly concerned with such devices primarily intended to be trailed behind a motor vehicle, such as a tractor.

While the device of my present invention is susceptible of embodiment in a wide range of sizes and is capable of use under many different conditions, it is designed particularly to be a relatively simple machine of moderate capacity which can perform quickly and easily the various functions of digging material, of loading the material for transportation as the device is advanced, of transporting the material any requisite distance, and then of discharging the material when desired and of spreading the material to any selected depth within the range of operation of the device.

It is an object of my invention to provide an excavator of this character, which is an improvement over those now available and which is quickly and easily adapted to use with certain auxiliary equipment, such as tractors and power take-offs, and is designed particularly for ready and efficient operation.

The foregoing and other objects are attained in the embodiment of the invention illustrated in the drawings, in which—

Fig. 1 is a side elevation of an excavator constructed in accordance with my invention;

Fig. 2 is a plan of the excavator;

Fig. 3 is a cross-section the plane of which is indicated by the line 3—3 of Fig. 2;

Fig. 4 is a cross-section the plane of which is indicated by the line 4—4 of Fig. 3;

Fig. 5 is a front elevation of the excavator;

Figs. 6 to 17, inclusive, are diagrams showing different positions of my excavator;

Fig. 18 is a fragmentary side elevation of a modified form of excavator actuated by cables;

Fig. 19 is a partial plan of the excavator shown in Fig. 18;

Fig. 20 is a partial side elevation of a further modified form of excavator with a yielding apron closure; and Fig. 21 is a partial front elevation of the structure illustrated in Fig. 20.

In its preferred form, the excavator of my invention includes a frame which is supported from the ground by suitable wheels and in which there is mounted a pair of links incorporated as part of the side walls of an auxiliary earth-retaining bowl. Articulated with the links, preferably by pivots, is a main bowl having a cutting edge at the lower foremost portion thereof, the main bowl being also supported from the main frame by a pair of cranks the pins of which are journaled in the main bowl side walls and the main bearings of which are mounted in the main frame, the cranks being actuated preferably by a rack and gear arrangement driven by hydraulic cylinders disposed within hollow portions of the frame and connected to a suitable and controlled source of hydraulic fluid under pressure. As an alternative, cables instead of hydraulic means are utilized to operate the cranks.

An exemplary form of my excavator is designed for use behind a draft implement, such as a tractor 5, which has a draft hitch 6 and is provided with a source of power, such as a hydraulic pump 7, having a controller 8, and from which hydraulic lines 9 and 11 extend, these lines being alternately pressure and return lines or being interconnected or blocked by manipulation of the lever 8 under the control of an operator in the customary fashion and which, therefore, is not described in detail. Adapted to be secured to the draft hitch 6 is a draft tongue 13 leading to the front axle 14 of my excavator. At the opposite extremities of the axle, front ground-engaging wheels 15 are disposed and support a part of the weight of the device. Upstanding from the central part of the axle 14 is a clevis 16 having a longitudinal pin 17 affording a pivotal connection with the axle and also having an upstanding king pin 18 received in a steering journal 19 supported in a pedestal 21 included in a main frame generally designated 22.

Merging with the pedestal and also included in the main frame 22 is a cross-beam 23 extending generally horizontally and transversely and at its opposite ends merging with side members 24 which are substantially identical and which are generally comprised by structural shapes forming hollow beams, swelled out or enlarged adjacent the forward ends to provide approximately cylindrical hollow members 26 provided with corner gussets 27 to assist in increasing the frame stiffness at the corners. The side members 24 adjacent their rearward ends carry depending brackets 29 in which means 31 is mounted to receive rear ground-engaging wheels 32 which bear the weight of the structure not borne by the front wheels 16. The rearmost portion of the side members 24 is connected by a cross-member 33, secured in place by suitable gussets 34 and 36 and provided with an apertured central pad 37 within which, if desired, a pivot pin 17' can be received in order to support the clevis 16 of a trailing excavator identical with the one described except for the removal of its draft tongue, front axle and wheels. By this connection a train of excavators can be employed.

On each of the side members 24 there is provided a depending bracket 41 carrying a bushing 42 in which is pivotally journaled, to turn about an axis 43, a pivot pin 44 outstanding from a link in the present instance constituted by the adjacent side panel 46 of a front apron or auxiliary bowl 47. The auxiliary bowl is constructed in a manner which is customary and includes not only the side panels 46 but likewise a bottom plate 48 which is substantially arcuate and is suitably joined to the side panels so as to provide an earth-sustaining member of considerable reception and carrying capacity.

Not only are the links or side panels 46 articulated on the main frame by means of the pivotal pins 43 and the bushings 42, but they are likewise articulated by pivotal connections 51 with the side walls 52 of a main bowl generally designated 53, so that relative pivotal movement of the links and remaining portions of the auxiliary bowl with respect to the main bowl takes place about an axis 54. The main bowl is made up in the customary fashion and includes not only the side walls 52 but likewise a back and bottom wall 56 which, adjacent the lower leading portion of the main bowl, terminates in a preferably detachable cutting edge 57 for facilitating excavation. The general dimensions and proportions of the side walls 52 are such that the pivotal axis 54 is disposed adjacent the central region thereof when the side wall is viewed in side elevation. The weight of the main bowl, which is transmitted by this connection, is transferred to the auxiliary bowl or, more particularly, to the link portions or side panels thereof for transfer through the pins 44 to the main frame, so that the main bowl is in part suspended from the main frame through the side panels of the auxiliary bowl acting as links.

But the location of the pivotal point 54 is such that additional support must be afforded the main bowl, and that is accomplished by means of crank pins 61 which extend into bushings 62 fixed in the side walls 52 so that relative pivotal movement takes place therebetween about an axis 63. This axis is preferably disposed near the upper portion of the side walls of the main bowl as they are viewed in side elevation, but still in the generally central region thereof. Each crank pin 61 is part of a crank 64 extending to a main bearing 66 in the side of the frame member 24 whereby the crank is mounted for relative rotation about an axis 67. Preferably, the distance between the axis 63 and the axis 67—that is to say, the radius of the crank—is substantially half the distance between the axis 67 and the axis 43; or, stated conversely, the distance between the axis 43 and the axis 67 is approximately twice the radius of the crank arm or the distance between the axis 67 and the axis 63. The distance, however, between the axis 67 and the axis 63 is less than the distance between the axis 63 and the axis 54. The effect of this relationship of the parts is to support the main bowl, through the auxiliary bowl or the side panels thereof acting as links and through the cranks 64 acting as support members, upon the main frame, so that the main bowl and the auxiliary bowl, when loaded, tend to jack-knife downwardly, for example, toward open position to discharge their load under the influence of gravity. All movements of the main bowl and the auxiliary bowl with respect to the main frame are accompanied by corresponding movement of the crank 64 and are represented by rotations of the crank with respect to the side members 24 of the main frame. The various successive positions are illustrated in Figs. 6 to 16, inclusive, wherein the locations of the different parts are shown for each thirty degrees of rotation of the crank 64 on the main frame. It is seen, beginning with Fig. 9 and taking the figures successively backward to Fig. 6, that, as the crank 64 is rotated counterclockwise, the main bowl 53 is lowered from its uppermost carrying position with the auxiliary bowl 47 closed, down to successively deeper excavating positions. During such lowering of the main bowl, the front apron or auxiliary bowl opens increasing amounts in proportion to the main bowl lowering or to afford a wide-open throat for digging at maximum depths. In addition, the main bowl remains substantially parallel to itself in all of its excavating positions, so that the cutting edge 57 and the bottom of the main bowl retain the optimum digging angle at all depths of excavation. A comparison of Fig. 17, an intermediate digging position, with Fig. 7, a minimum digging position, and with Fig. 6, a maximum digging position, shows substantially the preferred digging angle throughout.

Rotation of the crank in the opposite, clockwise direction, as seen from Fig. 6 to Fig. 16, lifts the main bowl from its deepest excavating position back to carrying position and concurrently closes the front apron, so that the load can be acquired and transported without loss. Further rotation of the crank in the same direction continues movement of the main bowl which then partakes more nearly of a rotary movement, so that the cutting edge moves, without substantial change in height, rearwardly from the front apron or auxiliary bowl which remains nearly stationary for a while (Figs. 10, 11, 12) and then opens quite rapidly (Figs. 13 to 16) to provide a very large discharge throat so that the contained material will discharge gravitally without hindrance or difficulty. After the main bowl and auxiliary bowl are well open, the pivotal axis 54 is lowered with respect to the ground as the opening becomes even greater, so that the trailing cutting edge 51 moves from a high position for maximum depth of spread to approach the ground more and more closely and thereby to reduce the thickness of spread of the discharged earth in any amount desired down to a minimum.

It is possible, as shown in Fig. 16, to position the cutting edge below the normal ground level so that the device can be used as a bottomless scraper of the type shown in Austin Patent No. 2,051,283, issued August 18, 1936.

In order to produce a controlled rotation of the crank, I preferably provide a power-actuating structure. In the present instance, the hollow side member 24 is provided with a removable cover plate 71 to facilitate the mounting on the main crank-shaft 66 of a gear 72 with which meshes a rack 73 held against a bearing plate 74 and in position by a backing idler 75 journaled on a pin 76 projecting inwardly from the cover 71. Lubrication of the rack and gear is provided for by a lubricating pipe 77 piercing the upper wall of the side member 24 and having an aperture 78 for the reception of a lubricating structure (not shown).

The rack at one end is joined to a piston rod 79 extending from a piston (not shown) within a cylinder 81 located within the enlarged hollow portion 26 of the side member and constituting a double-acting expansible chamber for positively moving the rack 73 to and fro for correspondingly rotating the gear 72 and the associated structure. The cylinder 81 is preferably mounted by means of a head plate 83 detachably secured to a pad 84 on the forward end of the side member 24 for ready axial installation and removal of the assembled cylinder and rack structure. Hydraulic conduits 86 and 87, extending from opposite ends of the hydraulic cylinders 81 at opposite sides of the machine, emerge through the respective caps 83 and join adjacent the center of the cross-member 23 in a removable support clip 88. The joined conduits are respectively connected by the lines 9 and 11 to the hydraulic source 7. By this means the entire hydraulic structure of the trailing vehicle can be subassembled, tested and placed within the remaining part of the excavator structure as a unit, or can be detached as an entire unit without breaking any hydraulic connections except with the lines 9 and 11, thus facilitating manufacture, shipment and repair. When the cylinders 81 are installed and connected, an operator on the tractor 5 can, by operating the lever 8 to vary the pressures within the connections 9 and 11, correspondingly rotate the cranks 64 and produce at will any of the various positions of the structure.

In many instances commercially it is desirable to disconnect or not supply the hydraulic actuating device and to utilize a cable-operated actuating device. This can alternatively be in addition to the hydraulic structure, which is then generally inoperative, and is especially useful when the tractor 5 is equipped with the usual two-drum winch controlled by the tractor operator. The hydraulic structure can be temporarily disabled by dropping the support idlers 75 from below the racks 73, thereby letting the racks drop out of mesh with the gears 72 so that the gears are free to turn, by removing the hydraulic fluid from the cylinders, or by omitting all of the hydraulic rack and gear structure completely. In any case, for cable operation there is fixed on the crank-shaft 66 a drum or spool 91 (Figs. 18 and 19) on which the terminals of a pair of operating cables 92 and 93 are anchored by a fastening 94. The cables are trained around a pair of pulleys 96 and 97 on the corner of the main frame 22 and a similar pair of centrally mounted pulleys 98 and 99. The operating structure (not shown) is of the customary kind, usually incorporating a pair of winch drums which are under the control of the operator and each of which can be left in braked position or in free-running position or in power-driven position, so that by alternately taking in and paying out the cables 92 and 93, the drum 91 is rotated in either directions. As a result, the crank-shaft 64 is rotated in either direction to produce various bowl and auxiliary bowl movements.

In some instances, as shown in Figs. 20 and 21, it is beneficial to provide in the otherwise rigid structure some means for closing the front apron yieldably and even to afford means for variably positioning the apron or auxiliary bowl. These means facilitate the use of the structure, especially in rocky soil or where solid materials are handled, and permit some range of choice, by the individual operator, in the detailed working of the machine. The arrangement generally is as previously disclosed, but, instead of being integrally incorporated as side panels of the auxiliary bowl, separate links 101 carry the pins 44 and the pivotal connections 51 with the side walls 52 of the main bowl 53. The links 101 are largely of box construction and are extended and joined by a cross-beam 102 to form an auxiliary frame, generally designated 103. The auxiliary bowl or front apron 104 is generally constructed as previously disclosed and includes an arcuate bottom plate 106, like the plate 48, which is joined to two side panels 107. These panels are not connected to the pivot pins 44 but are journaled upon the pivotal connections 51 coaxially with the auxiliary frame 103, so that the auxiliary bowl is capable of pivotal movement independently of the auxiliary frame.

To restrain such independent movement, however, and to afford a variable relationship between the auxiliary bowl and the auxiliary frame, the plate 106 carries an anchor 108. This is constituted by a cross-strap having depending legs thereon outturned at their lower ends to provide stops 109 adapted to abut the cross-beam 102. The anchor is variably held in place by removable fasteners 111 extending through the plate 106 and engageable with any selected one of a plurality of holes 112 in the anchor.

While the weight of the auxiliary bowl 104 tends to press the stops 107 against the beam 102, this effect is augmented by springs 113 stretched between lugs on the anchor 108 and similar lugs on the beam 102. With this arrangement, the final closing movement of the front apron is yieldingly effectuated, so that, despite obstructions, no excessive strains are imposed upon the moving parts. Also, the relative position of the front apron can be somewhat varied for optimum results, and this is done without disturbing the established tension of the springs.

I claim:

1. An excavator comprising a frame, an auxiliary bowl pivoted on said frame, a crank rotatably mounted on said frame, and a main bowl rotatably engaging said crank and pivoted to said auxiliary bowl.

2. An excavator comprising a frame, a crank journaled on said frame, a bowl having an open end and rotatably engaging said crank, a link pivoted at one end to said bowl and at the other end to said frame, and means moved by said link for closing said open end.

3. An excavator comprising a frame, a main bowl having a side wall and a cutting edge at the lower leading edge thereof, a crank journaled on said frame and rotatably engaging said side wall, an auxiliary bowl disposed ahead of said main bowl and having a side panel overlapping said side wall, a pivot connecting said side wall and said side panel, and a pivot connecting said side panel and said frame.

4. An excavator comprising a frame, a main bowl having side walls and a cutting edge at the lower leading edge thereof, cranks journaled on said frame and rotatably engaging said side walls, links pivoted on said frame and pivoted on said side walls, and means for rotating said cranks through more than a half circle.

5. An excavator comprising a frame, a crank journaled on said frame to turn about a first axis, a bowl, a pin on said crank journaled on said bowl to turn about a second axis a predetermined distance from said first axis, a link pivoted on said frame about a third axis approximately twice said predetermined distance from said first axis, a pivot connection between said link and said bowl having a fourth axis which is more than said predetermined distance away from said second axis, and means for rotating said crank through more than a half circle.

6. An excavator comprising a frame, a crank journaled on said frame to turn about a first axis through more than a half circle, a bowl, a pin on said crank journaled on said bowl to turn about a second axis a predetermined distance from said first axis, a link pivoted on said frame about a third axis, and a pivot connection between said link and said bowl having a fourth axis which is more than said predetermined distance away from said second axis.

7. An excavator comprising a frame, a member rotatable with respect to said frame about a first axis through more than a half circle, a bowl, means connecting said member and said bowl for relative rotation about a second axis a predetermined distance from said first axis, and a link connected to said frame for rotation about a third axis and connected to said bowl for rotation about a fourth axis more than said predetermined distance away from said second axis.

8. An excavator comprising a frame, a member rotatable with respect to said frame about a first axis through more than a half circle, a main bowl, means connecting said member and said bowl for relative rotation about a second axis a predetermined distance from said first axis, an auxiliary bowl, means connecting said auxiliary bowl and said frame for relative rotation about a third axis, and means for connecting said auxiliary bowl and said main bowl for relative rotation about a fourth axis a fixed distance away from said second axis.

9. An excavator comprising a frame having hollow members, cranks journaled on said frame and extending into said hollow portions, a bowl mounted on said cranks, and means within said hollow portions and engaging said cranks for operating said cranks to move said bowl.

10. An excavator comprising a frame, an auxiliary bowl mounted on said frame, a crank mounted on said frame, and a main bowl supported by said crank and said auxiliary bowl.

11. An excavator comprising a frame, an auxiliary bowl pivoted on said frame, a crank rotatably mounted on said frame, and a main bowl supported by said crank and said auxiliary bowl.

12. An excavator comprising a frame, an auxiliary bowl articulated to said frame, an operating crank rotatably mounted on said frame, a main bowl suspended by said operating crank and said auxiliary bowl, and means for rotating said operating crank with respect to said frame.

13. An excavator comprising a frame having hollow members, an auxiliary bowl having side panels, means pivoting said panels on said frame, cranks journaled in said frame, a main bowl having side walls, crank pins connecting said walls and said cranks to pivot about an axis, means for connecting said side walls to said side panels to pivot about a different axis, and means within said hollow members for rotating said cranks.

14. An excavator comprising a main bowl, an auxiliary frame pivoted on said main bowl to turn about a predetermined axis, an auxiliary bowl mounted on said main bowl to pivot about said axis, and a spring joining said auxiliary frame and said auxiliary bowl for yielding conjoint movement.

15. An excavator comprising a main bowl, an auxiliary frame pivoted on said main bowl to turn about a predetermined axis, an auxiliary bowl mounted on said main bowl to turn about said axis, spring means for urging relative turning movement between said auxiliary frame and said auxiliary bowl, and a stop for limiting said relative turning movement.

16. An excavator comprising a frame, a crank rotatable on said frame about a first axis, a main bowl having a forward edge, a pivot connecting said bowl and said crank for relative rotation about a second axis which in a predetermined position of said crank is above and behind said first axis, a link, a pivot connecting said link and said frame for relative rotation about a third axis which is below and ahead of said first axis, and a pivot connecting said link and said bowl for relative rotation about a fourth axis which in said predetermined position of said crank is below and behind said first axis.

17. An excavator comprising a frame, a crank journaled on said frame to rotate about a first axis, a main bowl having an open forward end, a pivot connecting said bowl and said crank for relative rotation about a second axis which in a predetermined position of said crank is behind said first axis, a link, a pivot connecting said link and said frame for relative rotation about a third axis which is ahead of said first axis, a pivot connecting said link and said bowl for relative rotation about a fourth axis which in said predetermined position of said crank is behind said first axis, and means moved by said link and effective when said crank is in said predetermined position to close the open end of said bowl.

18. An excavator comprising a frame, an auxiliary bowl assembly pivotally mounted on said frame, a crank rotatably mounted in said frame, a main bowl suspended at one point by said auxiliary bowl assembly and at another point by said crank, and means for rotating said crank.

19. An excavator comprising a frame, a crank journaled on said frame to turn about a first axis through more than a half circle, a bowl having a forward cutting edge and a rear wall, a crank pin pivotally connecting said crank to said bowl for relative rotation about a second axis approximately midway between said cutting edge and said rear wall, a link pivoted on said frame forwardly of said first axis, and a pivot connecting said link and said bowl approximately midway between said cutting edge and said rear wall.

20. An excavator comprising a frame, a crank journaled on said frame to turn about a first axis through more than a half circle, a bowl having a forward cutting edge and a rear wall, a crank pin pivotally connecting said crank to said bowl for relative rotation about a second axis approximately midway between said cutting edge and said rear wall, a link pivoted on said frame forwardly of said first axis, a pivot connecting said link and said bowl approximately midway between said cutting edge and said rear wall, and an auxiliary bowl moved by said link.

21. An excavator comprising a frame, a crank having a rotatable mounting on said frame, a bowl having a forward cutting edge, a crank pin pivotally connecting said crank and said bowl, a link, a first pivot connecting said link to said frame ahead of said crank mounting, a second pivot connecting said link to said bowl behind said first pivot, and an auxiliary bowl moved by said link.

22. An excavator comprising a frame, a main bowl adjacent said frame, a crank disposed with its hub journaled in said frame and its crank pin journaled in said main bowl, means for rotating said crank hub through more than a half circle, and an auxiliary bowl assembly having a part pivoted on said frame and also pivoted on said main bowl.

23. An excavator comprising a frame, a main bowl having a side wall, an auxiliary bowl assembly having a side panel overlapping said side wall, a pivot connecting said overlapping wall and panel for relative rotation, a pivot connecting said auxiliary bowl assembly and said frame, a crank journaled in said frame and having a crank pin journaled in said side wall, and means for rotating said crank through more than a half circle.

24. An excavator comprising a frame, a main bowl having a side wall, a crank journaled in said frame and having a crank pin journaled in said side wall, means for rotating said crank for more than a half circle, and a link pivoted to said frame and to said side wall.

25. An excavator comprising a frame, a main bowl, an auxiliary bowl assembly, a pivot connecting said auxiliary bowl assembly and said main bowl, a pivot connecting said auxiliary bowl assembly and said frame, a crank having a crank pin journaled in said main bowl and a hub journaled in said frame, and means engaging said hub for applying a crank-rotating force thereto.

26. An excavator comprising a frame, a main bowl having an opening in the forward end thereof, a link pivoted to said frame at a predetermined point and also pivoted to said main bowl rearwardly of said point, a crank having a crank pin journaled in said main bowl and a hub journaled in said frame behind said point, and means for rotating said crank through more than a half circle.

27. An excavator comprising a frame, a main bowl having an opening in the forward end thereof, an auxiliary bowl assembly pivoted to said frame at a predetermined point and also pivoted to said main bowl rearwardly of said point, a crank having a crank pin journaled in said main bowl and a hub journaled in said frame behind said point, and means engaging said hub for applying a crank-rotating force thereto.

28. An excavator comprising a frame, a crank journaled on said frame, a bowl rotatably engaging said crank, a link pivoted at a predetermined point on said bowl and at a forward point to said frame, an auxiliary bowl pivoted with respect to said link, and means joining said auxiliary bowl and said link for conjoint movement.

29. An excavator comprising a frame, a bowl, means for supporting said bowl on said frame, a link pivoted to said bowl to turn about a predetermined axis and pivoted to said frame, an auxiliary bowl mounted to pivot about said axis, and means joining said link and said auxiliary bowl for conjoint movement.

ELLSWORTH W. AUSTIN.